US009715207B2

(12) United States Patent
Hayakawa

(10) Patent No.: US 9,715,207 B2
(45) Date of Patent: Jul. 25, 2017

(54) IMAGE FORMING APPARATUS PROVIDED WITH SWITCHING MECHANISM FOR SWITCHING TRANSMISSION STATE OF DRIVE FORCE

(71) Applicant: Brother Kogyo Kabushiki Kaisha, Nagoya (JP)

(72) Inventor: Atsushi Hayakawa, Okazaki (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 15/080,735

(22) Filed: Mar. 25, 2016

(65) Prior Publication Data

US 2017/0075279 A1    Mar. 16, 2017

(30) Foreign Application Priority Data

Sep. 16, 2015    (JP) .................................. 2015-182891

(51) Int. Cl.
G03G 15/00 (2006.01)
F16H 1/20 (2006.01)

(52) U.S. Cl.
CPC ........... *G03G 15/6511* (2013.01); *F16H 1/20* (2013.01); *G03G 15/657* (2013.01); *G03G 15/6564* (2013.01); *G03G 2215/0054* (2013.01); *G03G 2215/00371* (2013.01); *G03G 2215/00383* (2013.01); *G03G 2215/00405* (2013.01); *G03G 2215/00409* (2013.01); *G03G 2215/00413* (2013.01); *G03G 2215/00421* (2013.01); *G03G 2215/00599* (2013.01);

(Continued)

(58) Field of Classification Search
CPC .................................................. G03G 15/6511
USPC .......................................................... 399/393
See application file for complete search history.

(56) References Cited

U.S. PATENT DOCUMENTS 6,139,010 A * 10/2000 Yokoi .................. B65H 3/0669
271/225
9,187,275 B2 * 11/2015 Hashimoto ............ B65H 1/266
(Continued)

FOREIGN PATENT DOCUMENTS

JP    H10-265084 A    10/1998
JP    H10-338370 A    12/1998
(Continued)

*Primary Examiner* — Anthony Nguyen
(74) *Attorney, Agent, or Firm* — Burr & Brown, PLLC

(57) ABSTRACT

An image forming apparatus includes a conveyer roller exposed to an attachment space and a drive force transmission mechanism for transmitting a drive force from a drive source. The drive force transmission mechanism includes a plate driving gear exposed to the attachment space, a transmission gear train transmitting a drive force to the conveyer roller and to the plate driving gear, and a switching mechanism. The switching mechanism includes a driven gear transmitting the drive force to the transmission gear train, a pendulum gear revolvable between a coupled position in which the pendulum gear is engaged with the driven gear and an uncoupled position in which the pendulum gear is separated from the driven gear, and a transmission switch movable between a first position for holding the pendulum gear in the uncoupled position and a second position for allowing the pendulum gear to revolve between the coupled and uncoupled positions.

7 Claims, 9 Drawing Sheets

(52) U.S. Cl.
CPC ............ *G03G 2215/0404* (2013.01); *G03G 2215/0634* (2013.01); *G03G 2215/2009* (2013.01)

(56) References Cited

U.S. PATENT DOCUMENTS

| | | | |
|---|---|---|---|
| 2001/0028144 A1* | 10/2001 | Imura | B65H 1/266 271/114 |
| 2005/0077674 A1* | 4/2005 | Yamamoto | B41J 11/0095 271/265.01 |
| 2006/0113722 A1* | 6/2006 | Hattori | B65H 1/12 271/121 |
| 2011/0233846 A1 | 9/2011 | Miwa | |
| 2012/0326382 A1* | 12/2012 | Hayayumi | B65H 1/266 271/117 |
| 2014/0284872 A1* | 9/2014 | Murashima | B65H 3/0684 271/121 |
| 2015/0084264 A1* | 3/2015 | Hino | B65H 85/00 271/3.18 |

FOREIGN PATENT DOCUMENTS

| | | |
|---|---|---|
| JP | 2001-097569 A | 4/2001 |
| JP | 2005-343670 A | 12/2005 |
| JP | 2011-195319 A | 10/2011 |

\* cited by examiner

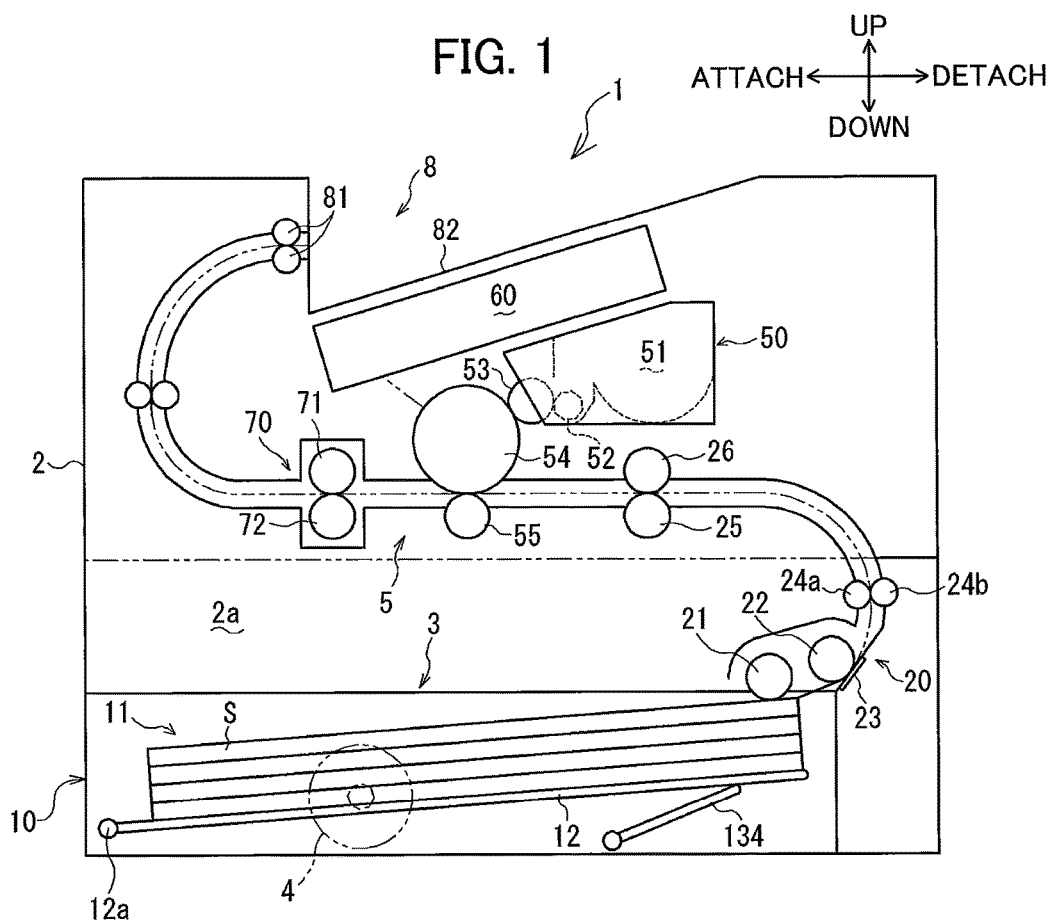

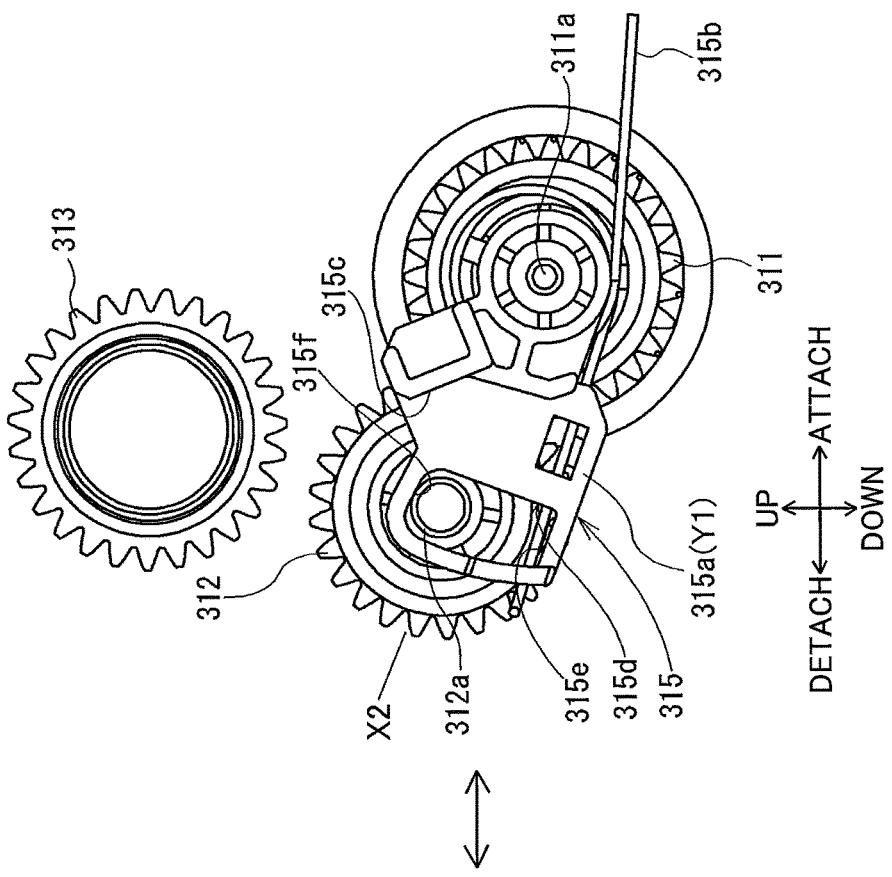
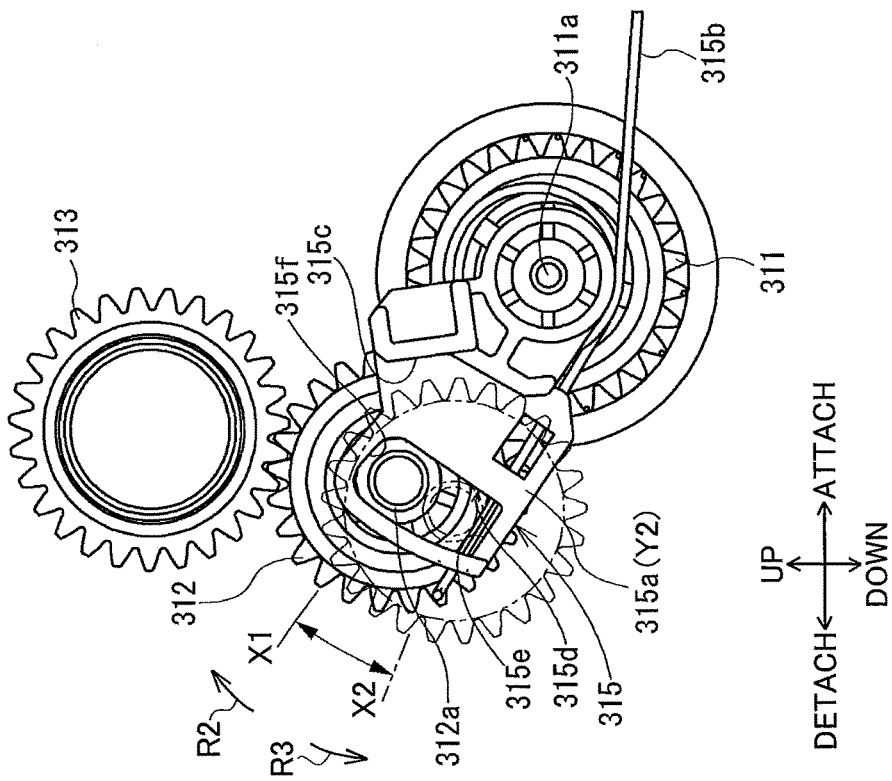

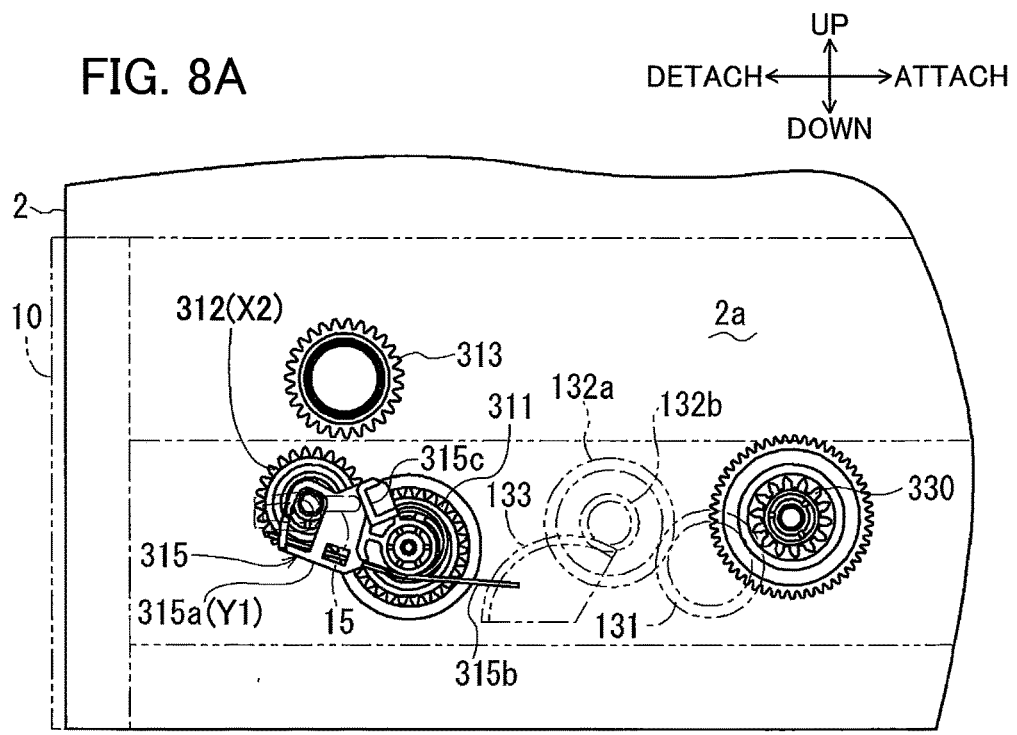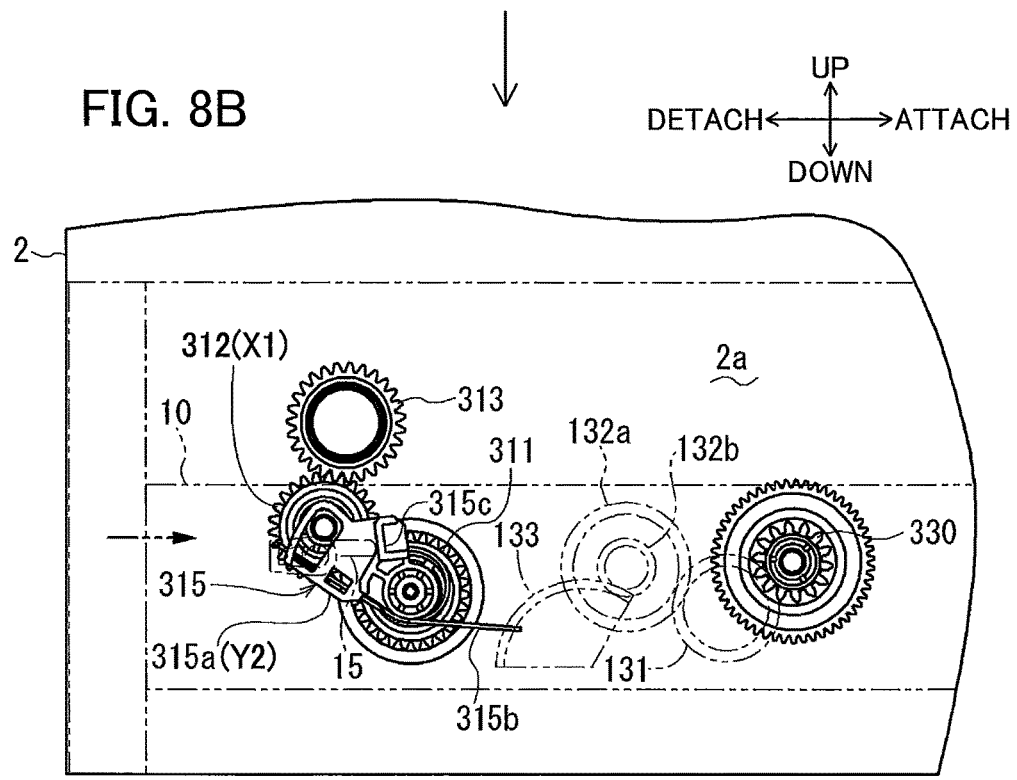

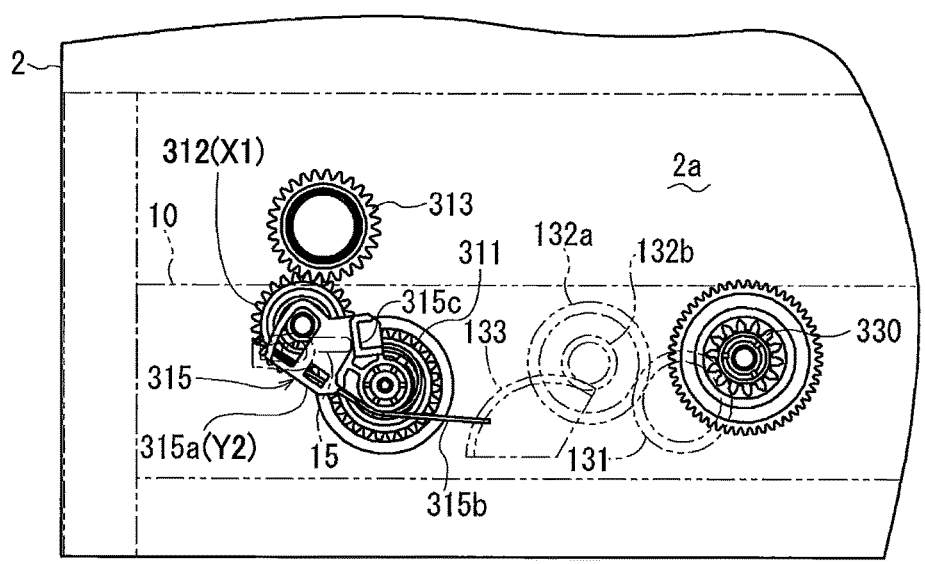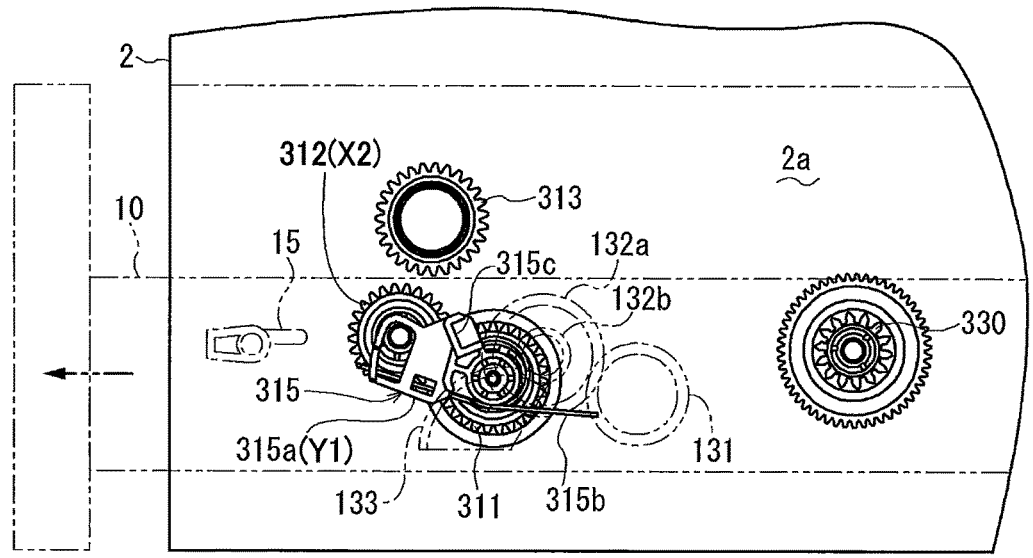

IMAGE FORMING APPARATUS PROVIDED WITH SWITCHING MECHANISM FOR SWITCHING TRANSMISSION STATE OF DRIVE FORCE

CROSS REFERENCE TO RELATED APPLICATION

This application claims priority from Japanese Patent Application No. 2015-182891 filed Sep. 16, 2015. The entire content of the priority application is incorporated herein by reference.

TECHNICAL FIELD

The present disclosure relates to an image forming apparatus provided with a sheet cassette.

BACKGROUND

According to a conventional image forming apparatus, a sheet cassette is provided which is movable between an attached position at which the cassette is attached to an attachment portion of a main housing and a detached position at which the cassette is detached (separated) from the attached position. The sheet cassette includes a sheet accommodating portion for accommodating a sheet, a lifter plate for supporting sheet(s), and a lift mechanism. The lifter plate is provided at the sheet accommodating portion and displaceable in vertical direction. The lift mechanism is configured to elevate the lifter plate.

For forming an image on the sheet in the conventional image forming apparatus, the lift mechanism is operated to lift the lifter plate to elevate a stack of sheets on the lifter plate to a sheet supplying position. Each one of the sheets lifted to the sheet supply position is separated from the sheet stack by a separation roller, and the separated sheet is conveyed toward an image forming unit by a conveyer roller. To this effect, the lift mechanism is driven by meshing engagement with a drive gear to which a drive force from a drive source is transmitted, so that the lifter plate can be elevated.

Here, the drive gear and the conveyer roller are exposed to a space in the sheet attachment portion. Therefore, if the drive gear and the conveyer roller are driven while the sheet cassette is at the detached position after the sheet cassette is detached from the attachment portion, foreign objects entered into the attachment portion from an outside may be trapped onto the drive gear and the conveyer roller, impeding normal image forming operation.

In order to avoid this drawback, Japanese Patent Application publication No. 2011-195319 discloses an image forming apparatus provided with a clutch provided in a gear train that transmits drive force from the drive source to the conveyer roller. The clutch is adapted for shutting off the drive force transmission to the conveyer roller in order to stop driving of the conveyer roller when the sheet cassette is at the detached position.

SUMMARY

According to the disclosed structure, drive force transmission to the conveyer roller can be shut-off for stopping driving of the conveyer roller when the sheet cassette is at the detached position. However, drive force transmission from the drive source to the drive gear is maintained in the detached position, and thus, the drive gear is still driven even when the sheet cassette is moved to the detached position.

It is therefore an object of the present disclosure to provide an image forming apparatus capable of stopping driving state of the conveyer roller and the drive gear when the sheet cassette is at the detached position, thus avoiding trapping of foreign objects to the conveyer roller and the drive gear.

In order to attain the above and other objects, according to one aspect, the disclosure provides an image forming apparatus including: a housing; an image forming unit; a drive source; a sheet cassette; a conveyer roller; and a drive force transmission mechanism. The housing is provided with a sheet cassette attachment portion defining an attachment space. The image forming unit is provided in the housing and is configured to form an image on a sheet. The drive source is configured to supply a drive force. The sheet cassette is movable between an attached position at which the sheet cassette is attached to the sheet cassette attachment portion and a detached position at which the sheet cassette is detached from the sheet cassette attachment portion. The sheet cassette includes: a lifter plate; a plate-elevating gear; and a pressing portion. The lifter plate is configured to support the sheet and to displace the sheet in vertical direction. The plate-elevating gear is configured to transmit the drive force to the lifter plate. The conveyer roller is exposed to the attachment space, and is configured to receive the drive force from the drive source to impart a conveying force to the sheet. The drive force transmission mechanism is configured to be coupled to the plate-elevating gear in a state where the sheet cassette is at the attached position to transmit the drive force to the plate-elevating gear, the drive force transmission mechanism being also configured to transmit the drive force to the conveyer roller. The drive force transmission mechanism includes: a plate driving gear; a transmission gear train; and a switching mechanism. The plate driving gear is exposed to the attachment space, and is configured to be coupled to the plate-elevating gear in the state where the sheet cassette is at the attached position to transmit the drive force to the plate-elevating gear. The transmission gear train is configured to transmit the drive force to the conveyer roller and to the plate driving gear. The switching mechanism is positioned between the drive source and the transmission gear train and is configured to turn on and off the transmission of the drive force from the drive source to the transmission gear train. The switching mechanism includes: a sun gear; a driven gear; a pendulum gear; and a transmission switch. The sun gear is driven by the drive force from the drive source. The driven gear transmits the drive force to the transmission gear train. The pendulum gear is in engagement with the sun gear to revolve around the sun gear, the pendulum gear being revolvable between a coupled position in which the pendulum gear is engaged with the sun gear and the driven gear and an uncoupled position in which the pendulum gear is engaged with the sun gear while separated from the driven gear. The transmission switch is configured to switch a position of the pendulum gear, the transmission switch being movable between a first position for holding the pendulum gear in the uncoupled position and a second position for allowing the pendulum gear to revolve between the coupled position and the uncoupled position, the transmission switch being urged from the second position toward the first position, the pressing portion of the sheet cassette being configured to press the transmission switch toward the second position in the state where the sheet cassette is at the attached position, the pendulum gear being revolvable between the coupled position and the uncoupled position upon movement of the transmission switch to the second position by the pressing portion in the state where the sheet cassette is at the attached position, and the pendulum gear being held at the uncoupled position upon movement of the transmission switch to the first position in a state where the sheet cassette is at the detached position.

BRIEF DESCRIPTION OF THE DRAWINGS

The particular features and advantages of the disclosure as well as other objects will become apparent from the following description taken in connection with the accompanying drawings, in which:

FIG. 1 is a schematic cross-sectional view of an image forming apparatus according to an embodiment;

FIG. 2 is a side view of a plate-elevating mechanism and a pressing portion in the image forming apparatus according to the embodiment;

FIG. 6A is a side view of for description of positions of a pendulum gear and a transmission switch in a switching mechanism in the image forming apparatus according to the embodiment, and showing the pendulum gear at a coupled position and the transmission switch at a second position;

FIG. 6B is a side view of for description of the positions of the pendulum gear and the transmission switch in the switching mechanism in the image forming apparatus according to the embodiment, and showing the pendulum gear at an uncoupled position and the transmission switch at a first position;

FIG. 8A is a side view for description of switching a drive force transmission state by the switching mechanism when the sheet cassette is moved from a detached position to an attached position in the image forming apparatus according to the embodiment, and showing the pendulum gear at the uncoupled position and the transmission switch at the first position;

FIG. 8B is a side view for description of switching the drive force transmission state by the switching mechanism when the sheet cassette is moved from the detached position to the attached position in the image forming apparatus according to the embodiment, and showing the pendulum gear at the coupled position and the transmission switch at the second position;

FIG. 9A is a side view for description of switching the drive force transmission state by the switching mechanism when the sheet cassette is moved from the attached position to the detached position in the image forming apparatus according to the embodiment, and showing the pendulum gear at the coupled position and the transmission switch at the second position;

FIG. 9B is a side view for description of switching the drive force transmission state by the switching mechanism when the sheet cassette is moved from the attached position to the detached position in the image forming apparatus according to the embodiment, and showing the pendulum gear at the uncoupled position and the transmission switch at the first position;

DETAILED DESCRIPTION

Figure 3:
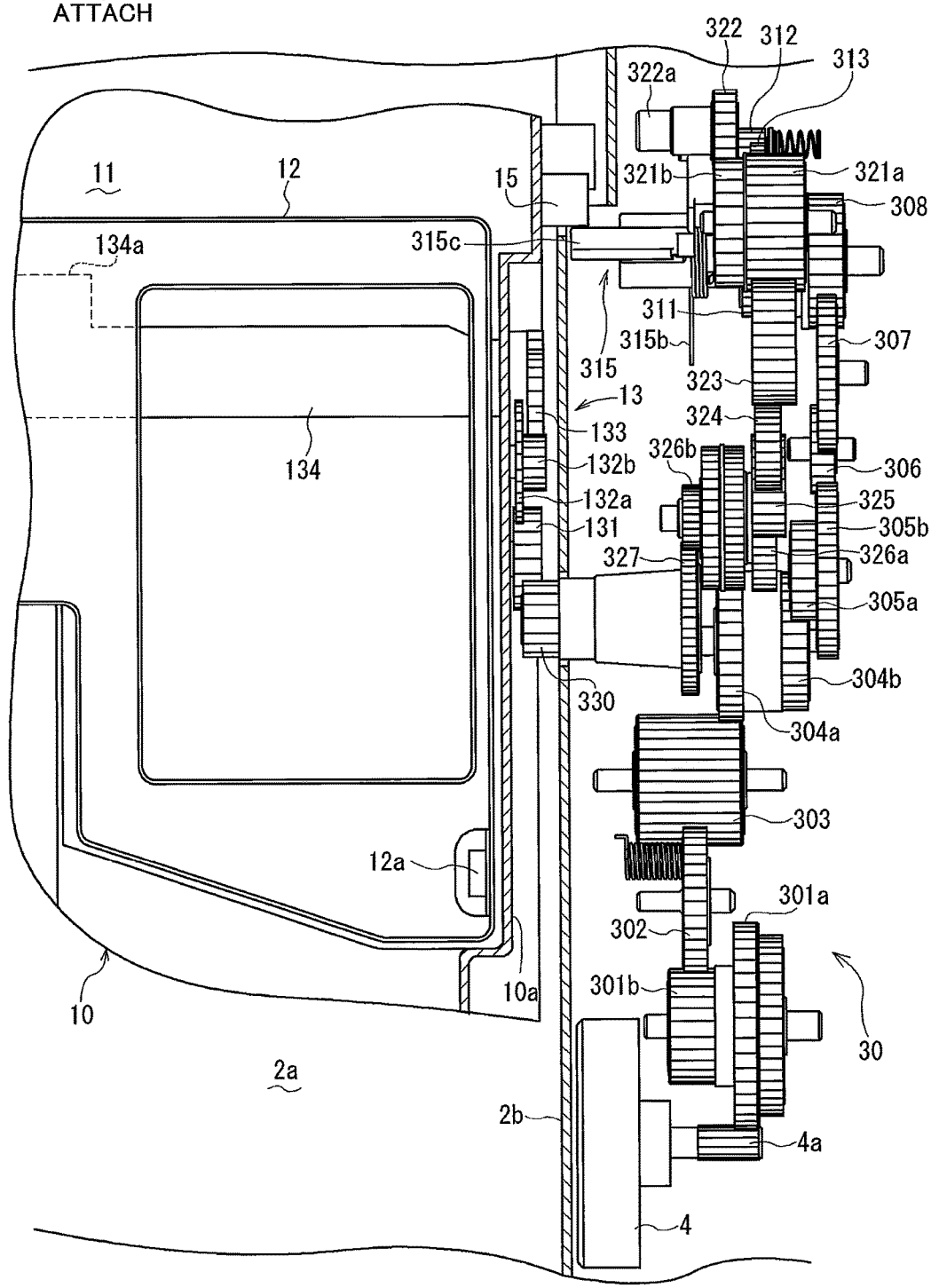
FIG. 3 is a plan view of the plate-elevating mechanism and a drive force transmission mechanism in the image forming apparatus according to the embodiment.

An image forming apparatus according to an embodiment will be described while referring to FIGS. 1 through 9.

Overall Structure of the Image Forming Apparatus

As shown in FIG. 1, the image forming apparatus 1 includes a main housing 2, a sheet supply unit 3, an image forming unit 5, a discharge unit 8, and a motor 4.

The sheet supply unit 3 is positioned in a lower portion of the main housing 2, and is adapted to convey sheets S placed in the sheet supply unit 3 to the image forming unit 5. The image forming unit 5 is positioned downstream of the sheet supply unit 3 in a sheet conveying direction and is adapted to form an image on the sheet S supplied from the sheet supply unit 3. The discharge unit 8 is positioned downstream of the image forming unit 5, and is adapted to discharge the sheet S on which the image has been formed to an outside of the main housing 2.

The sheet supply unit 3 includes a sheet cassette 10, a sheet supply mechanism 20, a conveyer roller 24a, a registration roller 25, and a drive force transmission mechanism 30 (FIG. 3).

The sheet cassette 10 is adapted to be attached to and detached from sheet cassette attachment portion 2a at a lower portion of the main housing 2. That is, the sheet cassette 10 is movable between an attached position at which the sheet cassette 10 is attached to the sheet cassette attachment portion 2a and a detached position at which the sheet cassette 10 is detached (separated) from the sheet cassette attachment portion 2a.

The sheet cassette 10 includes a sheet accommodating portion 11 for accommodating sheets S, a lifter plate 12 positioned in the sheet accommodating portion 11 for supporting the sheets, and a plate-elevating mechanism 13 (FIG. 2) provided with a plate-elevating gear 131 for transmitting drive force to the lifter plate 12. The lifter plate 12 is adapted to displace the sheets S placed on the lifter plate 12 upward and downward (in vertical direction).

The sheet cassette 10 is inserted into the sheet cassette attachment portion 2a from rightward to leftward in FIG. 1 to attach the sheet cassette 10 to the sheet cassette attachment portion 2a and to position the sheet cassette 10 at the attached position. In a state where the sheet cassette 10 is at the attached position, the sheet cassette 10 is attached to the sheet cassette attachment portion 2a and is accommodated in an attachment space formed therein. Further, the sheet cassette 10 is pulled out rightward in FIG. 1 so as to position the sheet cassette 10 at a detached position at which the sheet cassette 10 is separated from the attached position.

In the following description, leftward/rightward direction in FIG. 1 will be referred to as "attachment/detachment direction", left side in FIG. 1 will be referred to as "attachment side", and right side in FIG. 1 will be referred to as "detachment side."

The lifter plate 12 has an end portion of attachment side pivotally movably supported to the sheet accommodating portion 11. The lifter plate 12 has another end portion of detachment side displaceable upward and downward upon pivotal movement of the lifter plate 12 about a pivot shaft 12a located at the end portion of the attachment side. The plate-elevating mechanism 13 is adapted to lift the lifter plate 12 upon driving the motor 4, so that the sheet S on the lifter plate 12 can be lifted to a sheet supply position.

The sheet supply mechanism 20 is adapted to separate each one of the sheets from remaining sheets placed in the sheet cassette 10, and to convey the separated sheet toward the conveyer roller 24a. The sheet supply mechanism 20 includes a pick-up roller 21, a separation roller 22, and a separation pad 23.

The pick-up roller 21 is adapted to pick-up a sheet S lifted to the sheet supply position by the liter plate 12, and is positioned upward of the another end portion of the detachment side of the lifter plate 12. The separation roller 22 is positioned downstream of the pick-up roller 21 in the sheet conveying direction, and the separation pad 23 faces the separation roller 22 and is urged toward the separation roller 22.

The sheet S picked-up by the pick-up roller 21 is conveyed toward the separation roller 22, and the sheet S is separated from remaining sheets at a position between the separation roller 22 and the separation pad 23 and is then conveyed toward the conveyer roller 24a.

The conveyer roller 24a is adapted to impart conveying force to the sheet S, and is positioned downstream of the sheet supply mechanism 20 in the sheet conveying direction. A paper dust removing roller 24b is positioned in confrontation with the conveyer roller 24a. The sheet S conveyed toward the conveyer roller 24a from the sheet supply mechanism 20 is nipped between the conveyer roller 24a and the paper dust removing roller 24b, and is conveyed toward the registration roller 25. The conveyer roller 24a is exposed to the attachment space formed in the sheet cassette attachment portion 2a.

The registration roller 25 is positioned downstream of the conveyer roller 24a in the sheet conveying direction. An opposing roller 26 is provided in confrontation with the registration roller 25. A leading end portion of the sheet S is nipped between the registration roller 25 and the opposing roller 26 and the sheet S is temporarily stopped, so that an orientation of the leading end portion is regulated by the registration roller 25 and the opposing roller 26. Then, the sheet S is conveyed toward the image forming unit 5 at a prescribed timing.

The drive force transmission mechanism 30 is adapted to transmit drive force from the motor 4 to the plate-elevating gear 131 of the plate-elevating mechanism 13 upon engagement with the elevation gear 131 in a state where the sheet cassette 10 is attached to the sheet cassette attachment portion 2a. The drive force transmission mechanism 30 is also adapted to transmit the drive force from the motor 4 to the conveyer roller 24.

The image forming unit 5 includes a process cartridge 50, an exposure unit 60, and a fixing unit 70. The process cartridge 50 is adapted to transfer an image onto a surface of the sheet S conveyed from the sheet supply unit 3, and includes a photosensitive drum 54. The exposure unit 60 is adapted to expose a surface of the photosensitive drum 54 to light. The fixing unit 70 is adapted to fix the transferred image to the sheet S.

The process cartridge 50 is positioned upward of the sheet cassette attachment portion 2a in the main housing 2, and includes a developing agent chamber 51, a supply roller 52, a developing roller 53, the photosensitive drum 54, and a transfer roller 55.

The exposure unit 60 includes a laser diode, a polygon mirror, lenses, and reflection mirrors. The exposure unit 60 is adapted to emit laser beam to expose the surface of photosensitive drum 54 to light for forming electrostatic latent image thereon on the basis of image data.

The developing agent chamber 51 accommodates therein toner as the developing agent. The toner in the chamber 51 is supplied to the supply roller 52 while the toner is agitated by an agitation member (not shown). The supply roller 52 is adapted to supply toner to the developing roller 53.

The developing roller 53 is disposed in contact with the supply roller 52, and is adapted to carry toner supplied from the supply roller 52. A friction member (not shown) is provided for charging the toner carried on the developing roller 53 with positive polarity. The developing roller 53 is applied with a developing bias having positive polarity by a bias application unit (not shown).

The photosensitive drum 54 is positioned adjacent to the developing roller 53. The surface of the photosensitive drum 54 is exposed to light by the exposure unit 60, after the surface is uniformly charged with positive polarity by a charger (not shown). The exposed region of the photosensitive drum 54 has a potential lower than that of the non-exposed region. Thus, an electrostatic latent image based on image data is formed on the photosensitive drum 54. Then, positively charged toner is supplied to the surface of the photosensitive drum 54 from the developing roller 53, so that the electrostatic latent image becomes a visible toner image.

The transfer roller 55 is faced with the photosensitive drum 54, and is applied with negative transfer bias by the bias application unit (not shown). The toner image carried on the surface of the photosensitive drum 54 is transferred to the sheet S when the sheet is nipped and conveyed through a transfer position between the photosensitive drum 54 and the transfer roller 55, while the transfer bias is applied to the surface of the transfer roller 55.

The fixing unit 70 includes a heat roller 71 and a pressure roller 72. The heat roller 71 is rotationally driven by a drive force from the motor 4, and the heat roller 71 is heated by electric power supply from a power source (not shown). The pressure roller 72 faces the heat roller 71 and in contact therewith. The pressure roller 72 is driven by the rotation of the heat roller 71. Toner image carried on the sheet S is thermally fixed to the sheet S when the sheet S is nipped and conveyed between the pressure roller 72 and the heat roller 71.

The discharge unit 8 includes a discharge roller 81 and a discharge tray 82. The discharge roller 81 is provided by a pair of rollers adapted to discharge sheet S conveyed from the fixing unit 70 toward an outside of the main housing 2. The discharge tray 82 is provided by an upper surface of the main housing 2. The sheet S discharged by the discharge roller 81 is received on the discharge tray 82.

Plate-Elevating Mechanism 13

The plate-elevating mechanism 13 for lifting the lifter plate 12 will next be described.

As shown in FIGS. 2 and 3, the plate-elevating mechanism 13 includes a plate-elevating gear 131 capable of transmitting a drive force for displacing the lifter plate 12 upward; a gear 132a disposed downstream of the plate-elevating gear 131 in a drive force transmitting direction; a gear 132b disposed downstream of the gear 132a in the drive force transmitting direction; a gear 133 disposed downstream of the gear 132b in the drive force transmitting direction; and a plate-elevating member 134 connected to the gear 133 for elevating (lifting) the lifter plate 12.

The plate-elevating gear 131 receives a drive force inputted from the motor 4 provided in the image forming apparatus 1. The plate-elevating gear 131 is engaged with the gear 132a and transmits the drive force to the same. The gear 132b is provided coaxially with the gear 132a and rotates together with the same. The gear 132b is engaged with the gear 133. Therefore, a drive force inputted into the gear 132a is outputted from the gear 132b to the gear 133. When a drive force is inputted from the gear 132b, the gear 133 drives the plate-elevating member 134. Accordingly, the plate-elevating gear 131 transmits a drive force to the lifter plate 12 through the gears 132a, 132b, and 133, and the plate-elevating member 134 to displace the lifter plate 12 upward.

The plate-elevating member 134 is a plate-shaped member elongated in a direction orthogonal to the attachment/detachment direction described above. The plate-elevating member 134 is provided with a contact part 134a. The contact part 134a is formed in the center region of the plate-elevating member 134 in the direction orthogonal to the attachment/detachment direction, and protrudes toward the detachment side described above. The contact part 134a contacts the bottom surface of the lifter plate 12.

Figure 4A:
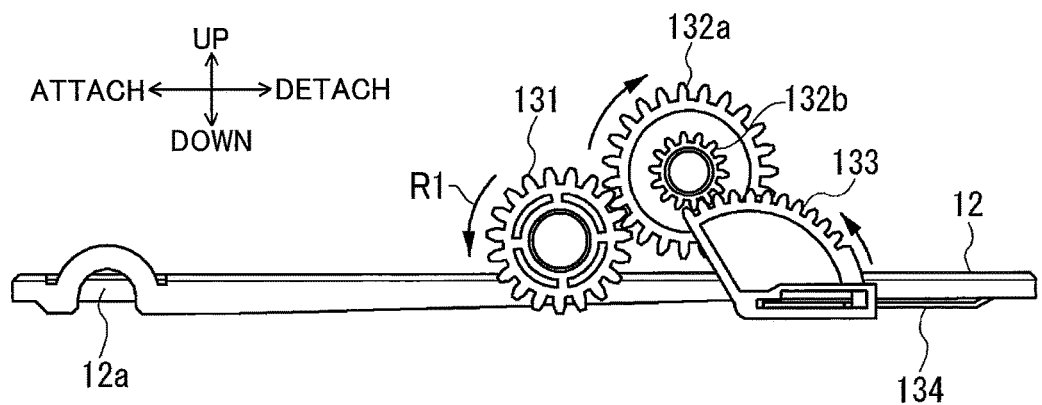
FIG. 4A is a side view for description of upward displacement of a lifter plate by the plate-elevating mechanism in the image forming apparatus according to the embodiment and showing a state where an end portion of the lifter plate is at a lowermost position.
Figure 4B:
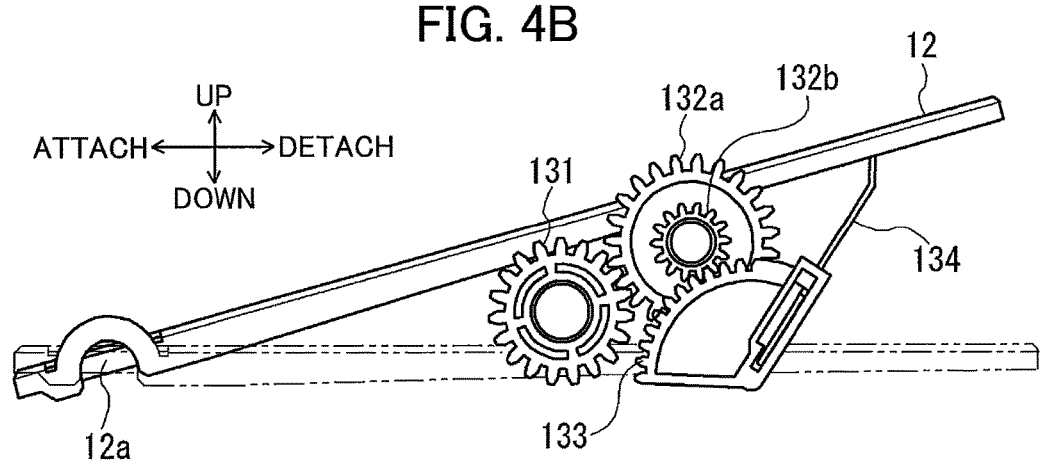
FIG. 4B is a side view for description of upward displacement of the lifter plate by the lift mechanism in the image forming apparatus according to the embodiment, and showing a state where the end portion of the lifter plate is at an elevated position.

As shown in FIG. 4A, when the lifter plate 12 is in its lowest position and the plate-elevating gear 131 is driven to rotate counterclockwise (R1 in FIG. 4A) the gear 133 also rotates counterclockwise. As the gear 133 rotates, the contact part 134a of the plate-elevating member 134 is elevated, as illustrated in FIG. 4B. As the contact part 134a rises, the lifter plate 12 pivotally moves about the pivot shaft 12a so that the another end portion of the detachment side of the lifter plate 12 is displaced upward.

Here, the sheet cassette 10 having a side wall 10a positioned at one side with respect to the direction orthogonal to the attachment/detachment direction. The plate-elevating gear 131, and gears 132a, 132b, and 133 are mounted on the outer surface of the side wall 10a.

Drive Force Transmission Mechanism 30

The drive force transmission mechanism 30 is provided in the main housing 2 for transmitting a drive force from the motor 4 to the plate-elevating gear 131 and the conveying roller 24a.

Figure 5:
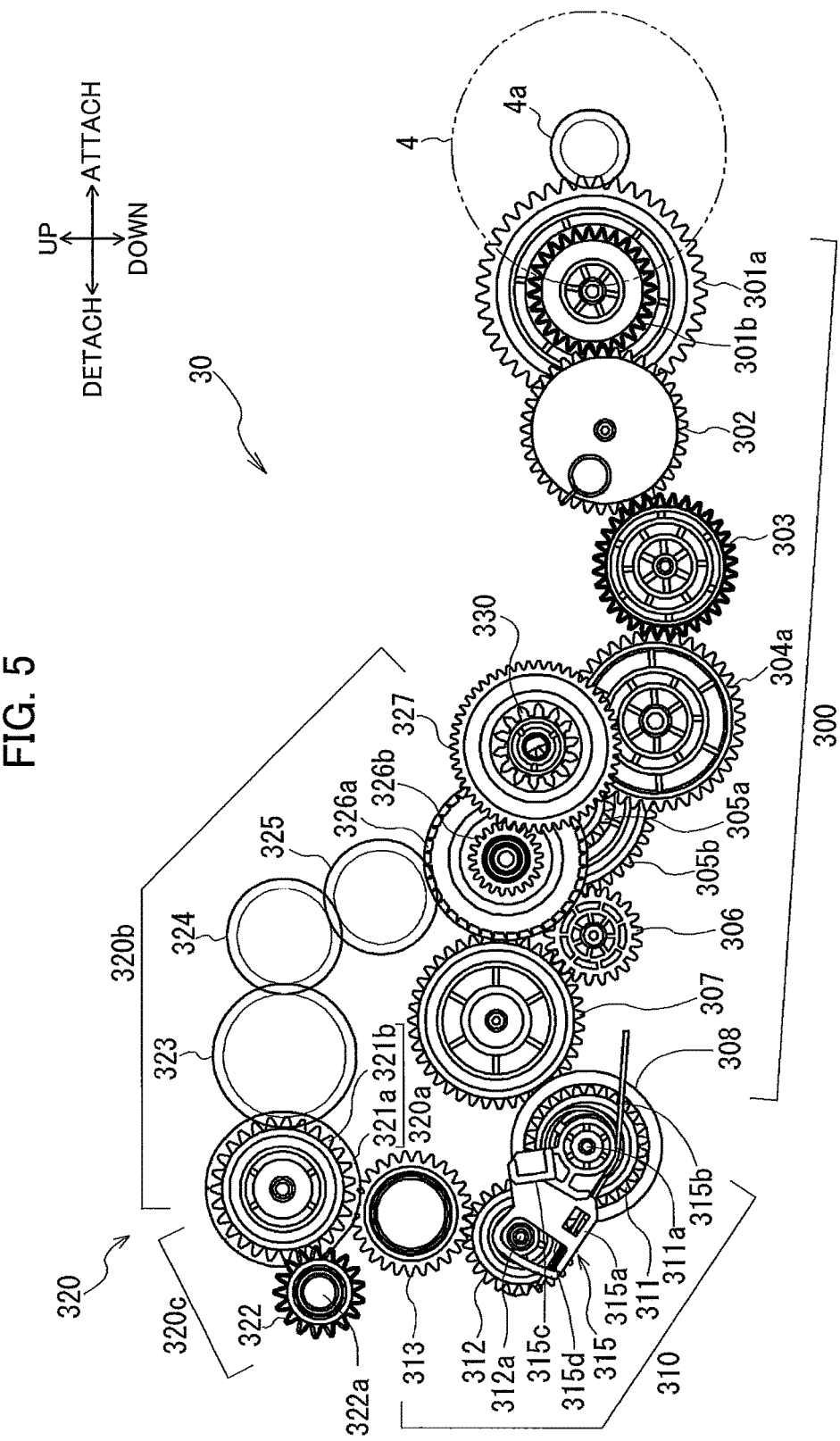
FIG. 5 is a side view of the drive force transmission mechanism in the image forming apparatus according to the embodiment.

As shown in FIG. 5, the drive force transmission mechanism 30 includes a plate driving gear 330 that is coupled to the plate-elevating gear 131 in a state where the sheet cassette 10 is in the attached position, and that is adapted to transmit the drive force from the motor 4 to the plate-elevating gear 131; a transmission gear train 320 that transmits the drive force to the conveying roller 24a and the plate driving gear 330; a switching mechanism 310 disposed between the motor 4 and the transmission gear train 320 for allowing and interrupting transmission of the drive force from the motor 4 to the transmission gear train 320; and a driving gear train 300 for transmitting the drive force from the motor 4 to the switching mechanism 310. The motor 4 is an example of claimed "drive source."

The driving gear train 300 includes a gear 301a engaged with a driving gear 4a provided on the drive shaft of the motor 4; a gear 301b provided coaxially with the gear 301a and capable of rotating together with the same; a gear 302 engaged with the gear 301b; a gear 303 engaged with the gear 302; a gear 304a engaged with the gear 303; a gear 304b provided coaxially with the gear 304a and capable of rotating together with the same; a gear 305a engaged with the gear 304b; a gear 305b provided coaxially with the gear 305a and capable of rotating together with the same; a gear 306 engaged with the gear 305b; a gear 307 engaged with the gear 306; and a gear 308 engaged with the gear 307.

The gears of the driving gear train 300, i.e., the gears 301a, 301b, 302, 303, 304a, 304b, 305a, 305b, 306, 307, and 308, are provided sequentially downstream in the drive force transmitting direction from the motor 4 side. The gear 308 is coupled to the switching mechanism 310. With this arrangement, the driving gear train 300 can transmit a drive force from the motor 4 to the switching mechanism 310.

As shown in FIGS. 6A and 6B, the switching mechanism 310 includes a sun gear 311 that can rotate about a rotational shaft 311a when driven by a drive force from the motor 4; a driven gear 313 that transmits the drive force from the switching mechanism 310 to the transmission gear train 320; a pendulum gear 312 capable of revolving (orbitally moving) around the sun gear 311 about the rotational shaft 311a while engaged with the sun gear 311 to move between a coupled position X1 in which the pendulum gear 312 is meshingly engaged with both the sun gear 311 and the driven gear 313, and an uncoupled position X2 in which the pendulum gear 312 is meshingly engaged with the sun gear 311 but separated (disengaged) from the driven gear 313; and a transmission switch 315 for switching the position of the pendulum gear 312 by pivotally moving between a first position Y1 for holding the pendulum gear 312 in the uncoupled position X2, and a second position Y2 for retaining the pendulum gear 312 so that the pendulum gear 312 can revolve between the coupled position X1 and the uncoupled position X2. In other words, the second position is a position for allowing the pendulum gear 312 to revolve between the coupled position X1 and the uncoupled position X2. As will be described later, the transmission switch 315 is urged from the second position Y2 toward the first position Y1.

The sun gear 311 is provided coaxially with the gear 308 of the drive gear train 300 and is capable of rotating together with the same. A drive force from the motor 4 is transmitted to the sun gear 311 through the drive gear train 300.

FIG. 6A shows the pendulum gear 312 in the coupled position X1 and the transmission switch 315 in the second position Y2. FIG. 6B shows the pendulum gear 312 in the uncoupled position X2 and the transmission switch 315 in the first position Y1.

In the coupled position X1, the pendulum gear 312 is at the end of its revolving range in the clockwise direction (R2 in FIGS. 6A). In the uncoupled position X2, the pendulum gear 312 is at the end of its revolving range in the counterclockwise direction (R3 in FIGS. 6A).

In the second position Y2, the transmission switch 315 is at the end of its pivotally movable range in the clockwise direction. In the first position Y1, the transmission switch 315 is at the end of its pivotally movable range in the counterclockwise direction.

The transmission switch 315 includes an arm member 315a that can pivotally move circumferentially (clockwise and counterclockwise) about the rotational shaft 311a of the sun gear 311, and a spring 315b that urges the arm member 315a toward the first position Y1 (that is, the uncoupled position X2 of the pendulum gear 312). In other words, the spring 315b urges the arm member 315a counterclockwise so as to move the transmission switch 315 toward the first position Y1. The spring 315b is an example of claimed "urging member."

The arm member 315a is configured of a plate-shaped member that protrudes radially outward from the central portion of the sun gear 311. The arm member 315a includes a pressure-receiving piece 315c. The pressure-receiving piece 315c protrudes in the axial direction of the rotational shaft 311a from a side surface of the arm member 315a. Further, the arm member 315a is formed with an elongated hole 315d. The elongated hole 315d is formed in the radially outer end portion of the arm member 315a and extends in the circumferential direction. The elongated hole 315d holds a rotational shaft 312a of the pendulum gear 312. The rotational shaft 312a is an example of claimed "shaft."

The elongated hole 315d is defined in part by a first edge 315e formed on the downstream side in the pivotally moving direction of the arm member 315a when the arm member 315a is pivotally moved to its first position Y1, and a second edge 315f formed on the downstream side in the pivotally moving direction of the arm member 315a when the arm member 315a is moved to its second position Y2. In FIG. 6, the edge on the counterclockwise side of the elongated hole 315d constitutes the first edge 315e, while the edge on the clockwise side constitutes the second edge 315f.

When the transmission switch 315 is in the second position Y2 shown in FIG. 6A, the first edge 315e and second edge 315f defining the elongated hole 315d are positioned circumferentially outside the revolving range of the rotational shaft 312a in the pendulum gear 312. Consequently, a gap is formed between the second edge 315f and the rotational shaft 312a when the pendulum gear 312 is in the coupled position X1, and between the first edge 315e and the rotational shaft 312a when the pendulum gear 312 is in the uncoupled position X2. In other words, the elongated hole 315d does not restrict movement of the pendulum gear 312 within its revolving range when the transmission switch 315 is in the second position Y2. Hence, when the arm member 315a is in the second position Y2, the rotational shaft 312a fitted into the elongated hole 315d can revolve over its entire revolving range between the coupled position X1 and the uncoupled position X2.

When the arm member 315a is in the first position Y1 shown in FIG. 6B, the first edge 315e of the elongated hole 315d is positioned circumferentially outside the revolving range of the rotational shaft 312a in the pendulum gear 312, while the second edge 315f of the elongated hole 315d is at the uncoupled position X2 within the revolving range of the rotational shaft 312a. That is, when the arm member 315a is in the first position Y1, the second edge 315f of the elongated hole 315d contacts and presses the rotational shaft 312a of the pendulum gear 312 toward the first-position side of the arm member 315a and holds the pendulum gear 312 in the uncoupled position X2.

In this way, the arm member 315a maintains the pendulum gear 312 in a revolvable state (orbitally movable state) between the coupled position X1 and uncoupled position X2 when the arm member 315a is in the second position Y2, and maintains the pendulum gear 312 in the uncoupled position X2 when the arm member 315a is in the first position Y1.

The driven gear 313 is disposed downstream of the sun gear 311 in the drive force transmitting direction. A drive force is transmitted from the sun gear 311 to the driven gear 313 when the pendulum gear 312 is in the coupled position X1, but is not transmitted when the pendulum gear 312 is in the uncoupled position X2.

As shown in FIGS. 3 and 5, the transmission gear train 320 includes a gear 321a engaged with the driven gear 313 of the switching mechanism 310; a gear 321b arranged coaxially with the gear 321a and capable of rotating together with the same; a gear 322 engaged with the gear 321b; a gear 323 engaged with the gear 321a; a gear 324 engaged with the gear 323; a gear 325 engaged with the gear 324; a gear 326a engaged with the gear 325; a gear 326b provided coaxially with the gear 326a and capable of rotating together with the same; and a gear 327 engaged with the gear 326b.

The transmission gear train 320 is adapted to split the drive force transmitted from the switching mechanism 310 into two branches respectively leading to the conveying roller 24a and the plate driving gear 330. The gears 321a-327 of the transmission gear train 320 configure a first gear train 320a for transmitting the drive force received from the switching mechanism 310 to the branching point, a second gear train 320b for transmitting the drive force from the branching point to the plate driving gear 330, and a third gear train 320c for transmitting the drive force from the branching point to the conveying roller 24a.

More specifically, the first gear train 320a is configured of the gears 321a and 321b. The second gear train 320b is configured of the gears 321a, 323, 324, 325, 326a, 326b, and 327. The third gear train 320c is configured of the gears 321b and 322.

The gear 327 of the second gear train 320b is arranged coaxially with the plate driving gear 330 and is capable of rotating together with the same. Thus, the first gear train 320a and second gear train 320b of the transmission gear train 320 can transmit a drive force from the switching mechanism 310 to the plate driving gear 330.

The gear 322 of the third gear train 320c has a rotational shaft 322a that serves as the drive shaft of the conveying roller 24a. Thus, the first gear train 320a and third gear train 320c in the transmission gear train 320 can transmit the drive force from the switching mechanism 310 to the conveying roller 24a.

The drive force from the motor 4 is inputted into the plate driving gear 330 through the gear 327 of the transmission gear train 320. When the sheet cassette 10 is in the attached position, the plate driving gear 330 is engaged with the plate-elevating gear 131 of the plate-elevating mechanism 13 and can output a drive force inputted into the plate driving gear 330 to the plate-elevating gear 131. In other words, the plate driving gear 330 is coupled with the plate-elevating gear 131 when the sheet cassette 10 is in its attached position, enabling a drive force to be transmitted from the plate driving gear 330 to the plate-elevating gear 131.

Conversely, when the sheet cassette 10 is in its detached position, i.e., when the sheet cassette 10 is detached (separated) from the sheet cassette attachment portion 2a, the plate driving gear 330 is separated from the plate-elevating gear 131 and cannot output a drive force to the plate-elevating gear 131. In other words, a drive force cannot be transmitted from the plate driving gear 330 to the plate-elevating gear 131 when the sheet cassette 10 is in the detached position.

Figure 7:
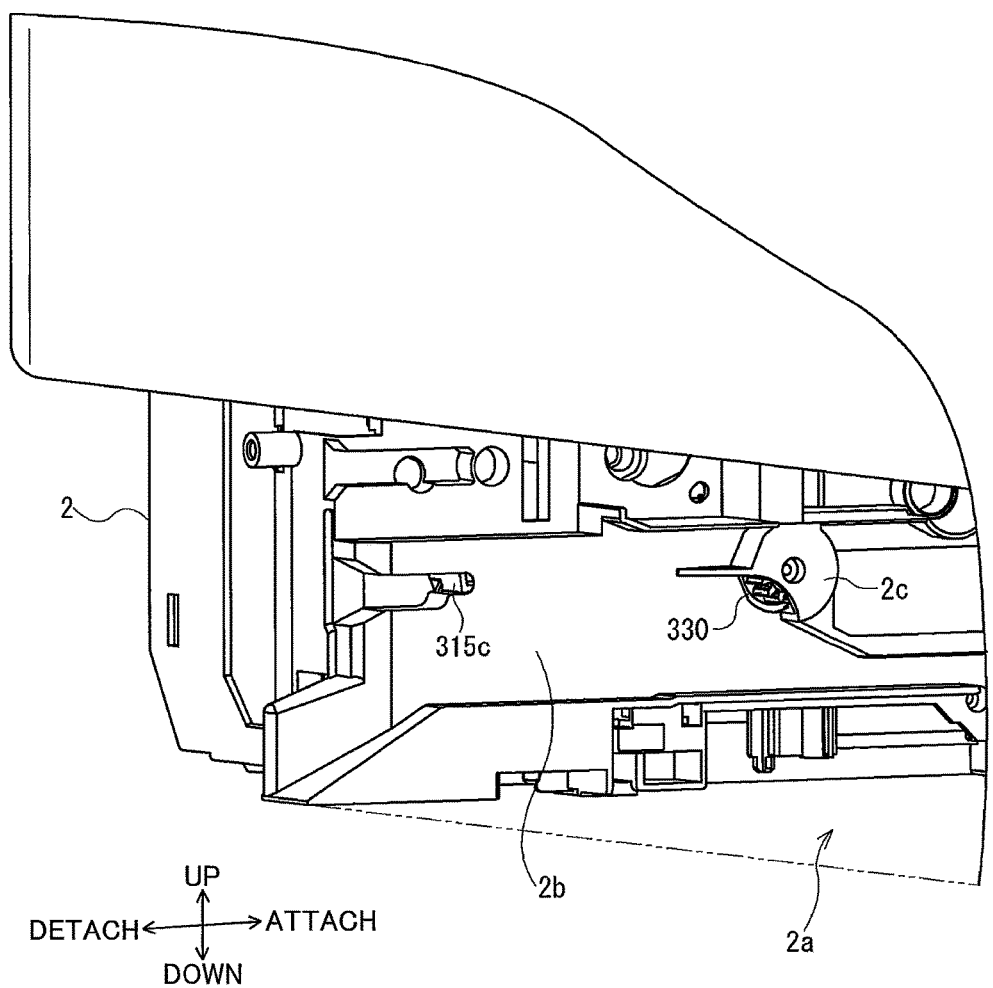
FIG. 7 is a perspective view showing a portion of a main housing having a cover for covering a plate driving gear exposed to an attachment space of a sheet cassette attachment portion in the image forming apparatus according to the embodiment.

The plate driving gear 330 is exposed to the attachment space of the sheet cassette attachment portion 2a in which the sheet cassette 10 is attached thereto. Specifically, as shown in FIG. 7, the sheet cassette attachment portion 2a is partially defined by a partition 2b arranged on one side of the main housing 2 in the direction orthogonal to the attachment/detachment direction. The plate driving gear 330 protrudes outside the housing 2 through a hole penetratingly formed in the partition 2b to be exposed to the attachment space defined in the sheet cassette attachment portion 2a.

A cover 2c is formed on the partition 2b so as to cover the plate driving gear 330 exposed to the attachment space formed in the sheet cassette attachment portion 2a, while leaving at least a coupled portion of the plate driving gear 330. The coupled portion is a portion at which the plate driving gear is coupled with the plate-elevating gear 131.

In the present embodiment, the cover 2c covers all of the plate driving gear 330 excluding the coupled portion thereof. That is only the coupled portion of the plate driving gear 330 is exposed to the attachment space defined in the sheet cassette attachment portion 2a.

Pressing Part 15 of the Sheet Cassette 10

As shown in FIG. 2, a pressing portion 15 is formed on the outer surface of the side wall 10a constituting the sheet cassette 10. When the sheet cassette 10 is attached to the sheet cassette attachment portion 2a, the pressing portion 15 presses the arm member 315a of the transmission switch 315 toward its second position Y2.

The pressing portion 15 is a protruding part that protrudes outward from the outer surface of the side wall 10a. The pressing portion 15 in the present embodiment is a plate-like protrusion forming a rib. However, the pressing portion 15 need not be shaped like a rib, but may instead be configured of a circular or square column-like member forming a boss, for example. As shown in FIG. 2, the pressing portion 15 is positioned downstream in the detachment direction of the plate-elevating mechanism 13 provided on the sheet cassette 10.

The pressing portion 15 contacts the pressure-receiving piece 315c of the arm member 315a when the sheet cassette 10 is in its attached position, pressing the arm member 315a toward its second position Y2. When the sheet cassette 10 is in its detached position, the pressing portion 15 is separated from the pressure-receiving piece 315c of the arm member 315a.

Operation of the Switching Mechanism 310 for Switching the Drive Transmission State The switching mechanism 310 is adapted to switch the transmission state of a drive force from the motor 4 to the plate driving gear 330 and conveying roller 24a depending on whether the sheet cassette 10 is in the attached position or the detached position. That is, the switching mechanism 310 is adapted to turn on and off the transmission of the drive force from the motor 4 to the transmission gear train 320.

When the sheet cassette 10 is in the detached position, the pressing portion 15 of the sheet cassette 10 is separated from the pressure-receiving piece 315c of the arm member 315a in the switching mechanism 310. Accordingly, the arm member 315a is urged into the first position Y1 by the urging force of the spring 315b. If the sheet cassette 10 is subsequently inserted toward the attachment side in the sheet cassette attachment portion 2a from this state, the pressing portion 15 of the sheet cassette 10 contacts the pressure-receiving piece 315c of the arm member 315a, as illustrated in FIG. 8A.

After the pressing portion 15 contacts the pressure-receiving piece 315c, the sheet cassette 10 is further inserted toward the attachment side until arriving in its attached position. At this time, the pressing portion 15 presses against the pressure-receiving piece 315c of the arm member 315a, and thus the arm member 315a is pivotally moved from the first position Y1 to the second position Y2, as illustrated in FIG. 8B.

When the arm member 315a is in its second position Y2, the pendulum gear 312 is maintained in a state in which it can revolve within its revolving range between the coupled position X1 and the uncoupled position X2. Accordingly, when the sun gear 311 rotates in the clockwise direction, the pendulum gear 312 revolves to the coupling-position side along with this rotation and becomes engaged with the driven gear 313. While the pendulum gear 312 is engaged with the driven gear 313, a drive force can be transmitted from the sun gear 311 to the driven gear 313. Accordingly, a drive force from the motor 4 can be transmitted to the conveying roller 24a and the plate driving gear 330 in this state.

On the other hand, when the sheet cassette 10 is in the attached position shown in FIG. 9A and is pulled in the detachment direction toward its detached position, the pressing portion 15 of the sheet cassette 10 separates from the pressure-receiving piece 315c of the arm member 315a, as shown in FIG. 9B. When the pressing portion 15 separates from the pressure-receiving piece 315c, the arm member 315a is pivotally moved from the second position Y2 to the first position Y1 by the urging force of the spring 315b.

As the arm member 315a pivotally moves to its first position Y1, the second edge 315f defining the elongated hole 315d presses the rotational shaft 312a of the pendulum gear 312 to the first-position side of the arm member 315a, maintaining the pendulum gear 312 in the uncoupled position X2.

When in its uncoupled position X2, the pendulum gear 312 is separated from the driven gear 313, interrupting the transmission of a drive force from the sun gear 311 to the driven gear 313. Consequently, the drive force from the motor 4 is no longer transmitted to the conveying roller 24a and the plate driving gear 330 and, hence, the conveying roller 24a and plate driving gear 330 are no longer driven to rotate.

Effects of the Present Embodiment

With the image forming apparatus 1 configured as described above in the present embodiment, the pressing portion 15 pivotally moves the transmission switch 315 to its second position Y2 when the sheet cassette 10 is placed in the attached position. In this state, the pendulum gear 312 is held so as to be revolvable (orbitaly movable) between the coupled position X1 and the uncoupled position X2. When the sheet cassette 10 is pulled out to the detached position, the transmission switch 315 pivotally moves to the first position Y1 to hold the pendulum gear 312 in its uncoupled position X2.

With this configuration, the transmission switch 315 holds the pendulum gear 312 in the uncoupled position X2 when the sheet cassette 10 is removed from the sheet cassette attachment portion 2a, i.e., placed in its detached position, thereby interrupting the drive force transmitted from the motor 4 to the plate driving gear 330. Consequently, since the plate driving gear 330 and conveying roller 24a no longer rotate, foreign objects will not get caught or trapped in the teeth of the plate driving gear 330 or in the conveying roller 24a when the sheet cassette 10 is removed from the sheet cassette attachment portion 2a, even though the plate driving gear 330 and the conveying roller 24a are exposed in the attachment space formed in the sheet cassette attachment portion 2a.

Further, the transmission switch 315 is provided with the arm member 315a that can pivotally move circumferentially about the rotational shaft 311a of the sun gear 311, and the spring 315b that urges the arm member 315a toward the uncoupled-position side of the pendulum gear 312. When the sheet cassette 10 is placed in the detached position, the pendulum gear 312 is held in its uncoupled position X2 by the spring 315b urging the arm member 315a toward the first position Y1. the rotational shaft 311a is an example of claimed "axis."

In order to hold the pendulum gear 312 in its uncoupled position X2, the arm member 315a pivotally moves about the rotational shaft 311a of the sun gear 311, which is the revolving center of the pendulum gear 312, to press the pendulum gear 312 toward the uncoupled-position side. Accordingly, the pendulum gear 312 can be smoothly extracted from the driven gear 313 when being moved from its coupled position X1 to its uncoupled position X2.

Further, while the plate driving gear 330 is provided in the main housing 2 and is exposed in the attachment space formed in the sheet cassette attachment portion 2a, the cover 2c is formed in the main housing 2 for covering the plate driving gear 330, excluding at least the coupled portion of the plate driving gear 330. Hence, the exposed area of the plate driving gear 330, the exposed area being exposed to the attachment space, can be reduced thereby suppressing foreign objects from entering into the plate driving gear 330.

Further, the transmission gear train 320 splits the drive force transmitted from the switching mechanism 310 so as to transmit a drive force to both the conveying roller 24a and plate driving gear 330. The transmission gear train 320 includes first gear train 320a for transmitting the drive force from the switching mechanism 310 to the branching point, the second gear train 320b for transmitting the drive force from the branching point to the plate driving gear 330, and the third gear train 320c for transmitting the drive force from the branching point to the conveying roller 24a.

With this arrangement, the switching mechanism 310 that is adapted to switch between transmission and interruption of the drive force is positioned on the motor 4 side of the branching point where the drive force is branched to the conveying roller 24a and plate driving gear 330. Accordingly, a single switching mechanism 310 can suffice to switch transmission of the drive force on and off to both the conveying roller 24a and the plate driving gear 330.

Further, the transmission switch 315 includes the elongated hole 315d for holding the rotational shaft 312a of the pendulum gear 312. When the transmission switch 315 is in the first position Y1, the second edge 315f defining the elongated hole 315d holds the rotational shaft 312a of the pendulum gear 312 in its uncoupled position X2. When the transmission switch 315 is in the second position Y2, the rotational shaft 312a of the pendulum gear 312 is retained so as to be revolvable between the coupled position X1 and uncoupled position X2.

Thus, the transmission switch 315 is configured to retain the rotational shaft 312a of the pendulum gear 312 in the elongated hole 315d and to switch the held state of the pendulum gear 312. Accordingly, the structure of the transmission switch 315 can be simplified, facilitating the design of the transmission switch 315.

Further, by forming the pressing portion 15 of the sheet cassette 10 as a rib that protrudes from the side surface of the side wall 10a, the pressing portion 15 can be formed in a simple shape that facilitates the manufacturing of the sheet cassette 10 through resin molding.

Modification of the Switching Mechanism 310

Next, the switching mechanism 310 according to a modification of the embodiment will be described. FIG. 10 shows the switching mechanism 310 according to this modification. In the modification, the switching mechanism 310 includes a transmission switch 317 configured of a torsion spring.

Specifically, the transmission switch 317 (the torsion spring) includes an operating arm 317a that can pivotally move between a first position Z1 (see FIG. 10B) for holding the pendulum gear 312 in the uncoupled position X2, and a second position Z2 (see FIG. 10A) for allowing the pendulum gear 312 to revolve between the coupled position X1 and uncoupled position X2. The operating arm 317a urges the pendulum gear 312 toward the uncoupled position X2. That is, the operating arm 317a is capable of urging the pendulum gear 312 toward the uncoupled position X2. The transmission switch 317 (the torsion spring) is an example of claimed "urging member."

Figure 10A:
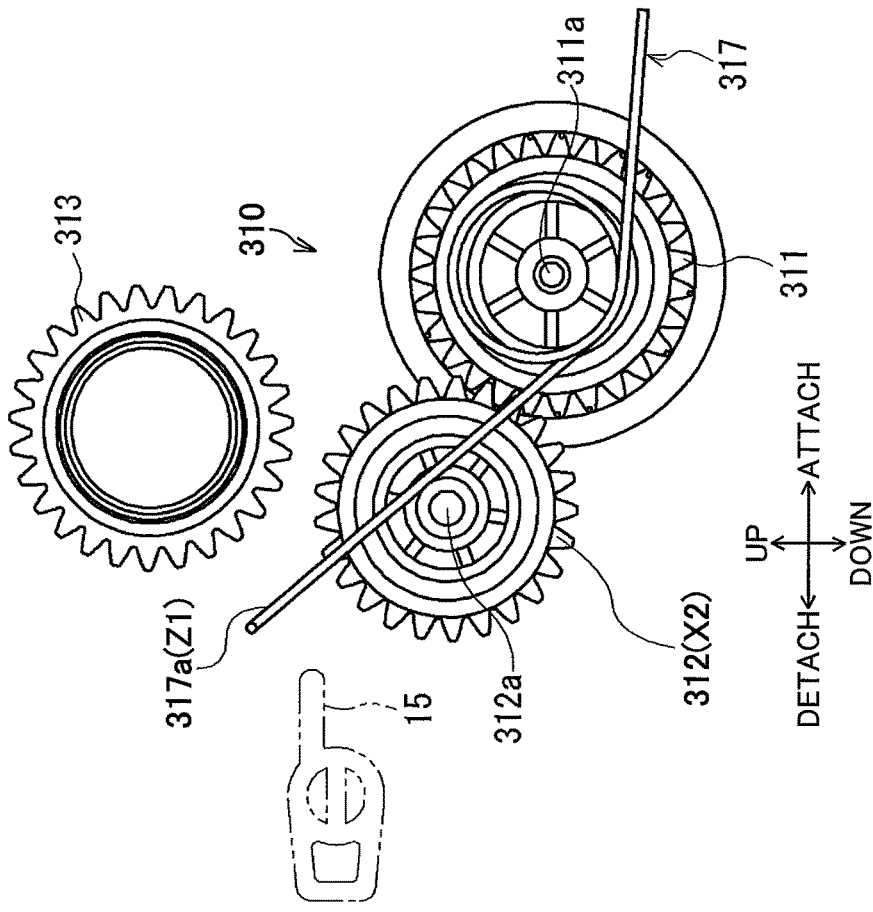
FIG. 10A is a side view of the switching mechanism according to a modification in which a transmission switch is provided by a torsion spring, and showing the torsion spring at the second position.
Figure 10B:
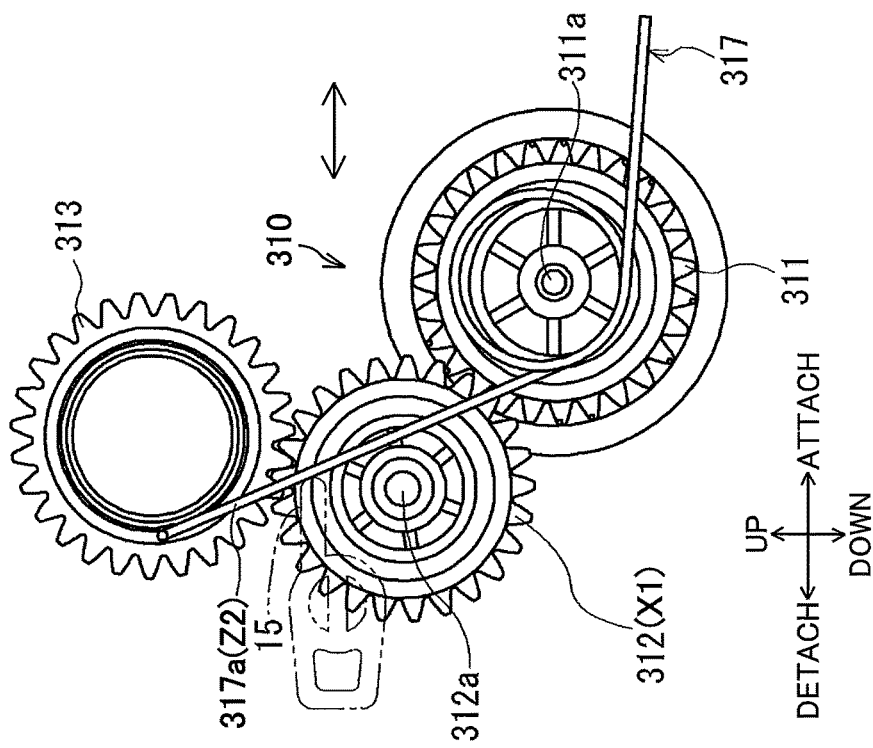
FIG. 10B is a side view of the switching mechanism according to the modification in which the transmission switch is provided by the torsion spring, and showing the torsion spring at the first position.

When the sheet cassette 10 is in the attached position, the operating arm 317a is pressed into the second position Z2 by the pressing portion 15 of the sheet cassette 10, as illustrated in FIG. 10A. When the sheet cassette 10 is in the detached position, the pressing portion 15 is separated from the operating arm 317a. Accordingly, the operating arm 317a is pivotally moved to its first position Z1 by the urging force of the transmission switch 317, as illustrated in FIG. 10B.

When in the second position Z2, the operating arm 317a is positioned circumferentially outside the revolving range of the rotational shaft 312a in the pendulum gear 312 and is separated from the pendulum gear 312. Hence, the operating arm 317a does not restrict movement of the pendulum gear 312 over its revolving range. Hence, when the operating arm 317a is in the second position Z2, the pendulum gear 312 is retained so as to be capable of revolving between the coupled position X1 and the uncoupled position X2 within its revolving range.

However, when in the first position Z1, the operating arm 317a is at the uncoupled position X2 within the revolving range of the rotational shaft 312a. That is, the operating arm 317a in the first position Z1 presses the rotational shaft 312a of the pendulum gear 312 toward the first-position side and holds the pendulum gear 312 in the uncoupled position X2.

In this way, the pendulum gear 312 is capable of revolving between the coupled position X1 and uncoupled position X2 in a state where the pressing portion 15 has pivotally moved the operating arm 317a to the second position Z2, and is held in the uncoupled position X2 when the rotational shaft 312a is urged by the operating arm 317a that has pivotally moved to its first position Z1.

Effects of the Modification of the Switching Mechanism 310

By configuring the transmission switch 315 of the switching mechanism 310 in the modification with the transmission switch 317 configured of the torsion spring as described above, the structure of the transmission switch 315 can be simplified. Accordingly, this structure can contribute to a smaller size and reduced cost for the drive force transmission mechanism 30.

While the embodiment and modifications thereof have been described above, the present disclosure is not limited to these. It would be apparent to those skilled in the art that various changes and modifications may be made therein without departing from the scope of the disclosure.

What is claimed is:

1. An image forming apparatus comprising:
   a housing provided with a sheet cassette attachment portion defining an attachment space;
   an image forming unit provided in the housing and configured to form an image on a sheet;
   a drive source configured to supply a drive force;
   a sheet cassette movable between an attached position at which the sheet cassette is attached to the sheet cassette attachment portion and a detached position at which the sheet cassette is detached from the sheet cassette attachment portion, the sheet cassette comprising:
      a lifter plate configured to support the sheet and to displace the sheet in vertical direction;
      a plate-elevating gear configured to transmit the drive force to the lifter plate; and
      a pressing portion;
   a conveyer roller exposed to the attachment space, and configured to receive the drive force from the drive source to impart a conveying force to the sheet; and
   a drive force transmission mechanism configured to be coupled to the plate-elevating gear in a state where the sheet cassette is at the attached position to transmit the drive force to the plate-elevating gear, the drive force transmission mechanism being also configured to transmit the drive force to the conveyer roller, the drive force transmission mechanism comprising:
      a plate driving gear exposed to the attachment space, and configured to be coupled to the plate-elevating gear in the state where the sheet cassette is at the attached position to transmit the drive force to the plate-elevating gear;
      a transmission gear train configured to transmit the drive force to the conveyer roller and to the plate driving gear; and
      a switching mechanism positioned between the drive source and the transmission gear train and configured to turn on and off the transmission of the drive force from the drive source to the transmission gear train, the switching mechanism comprising:
         a sun gear driven by the drive force from the drive source;
         a driven gear transmitting the drive force to the transmission gear train;
         a pendulum gear in engagement with the sun gear to revolve around the sun gear, the pendulum gear being revolvable between a coupled position in which the pendulum gear is engaged with the sun gear and the driven gear and an uncoupled position in which the pendulum gear is engaged with the sun gear while separated from the driven gear; and
         a transmission switch configured to switch a position of the pendulum gear, the transmission switch being movable between a first position for holding the pendulum gear in the uncoupled position and a second position for allowing the pendulum gear to revolve between the coupled position and the uncoupled position, the transmission switch being urged from the second position toward the first position, the pressing portion of the sheet cassette being configured to press the transmission switch toward the second position in the state where the sheet cassette is at the attached position, the pendulum gear being revolvable between the coupled position and the uncoupled position upon movement of the transmission switch to the second position by the pressing portion in the state where the sheet cassette is at the attached position, and the pendulum gear being held at the uncoupled position upon movement of the transmission switch to the first position in a state where the sheet cassette is at the detached position.

2. The image forming apparatus according to claim 1, wherein the transmission switch comprises:
   an arm member pivotally movable about an axis of the sun gear in a circumferential direction; and
   an urging member configured to urge the arm member toward the first position, the pendulum gear being revolvable between the coupled position and the uncoupled position upon movement of the arm member to the second position by the pressing portion in the state where the sheet cassette is at the attached position, and the pendulum gear being held at the uncoupled position upon movement of the arm member to the first position by an urging force from the urging member in the state where the sheet cassette is at the detached position.

3. The image forming apparatus according to claim 1, wherein the transmission switch comprises an urging member configured to urge the pendulum gear toward the uncoupled position, the pendulum gear being revolvable between the coupled position and the uncoupled position upon movement of the urging member to the second position by the pressing portion in the state where the sheet cassette is at the attached position, and the pendulum gear being held at the uncoupled position upon movement to the first position by an urging force from the urging member in the state where the sheet cassette is at the detached position.

4. The image forming apparatus according to claim 1, wherein the plate driving gear is provided at the housing;
   wherein the plate driving gear has a coupled portion at which the plate driving gear is coupled with the plate-elevating gear; and
   wherein the housing includes a cover covering the plate driving gear excluding the coupled portion thereof.

5. The image forming apparatus according to claim 1, wherein the transmission gear train is configured to split the drive force transmitted from the switching mechanism into two branches respectively leading to the conveying roller and the plate driving gear at a branching point, the transmission gear train comprising:
   a first gear train transmitting the drive force received from the switching mechanism to the branching point;
   a second gear train transmitting the drive force received from the branching point to the plate driving gear; and
   a third gear train transmitting the drive force received from the branching point to the conveyer roller.

6. The image forming apparatus according to claim 1, wherein the transmission switch is formed with an elongated hole holding a shaft of the pendulum gear, the transmission switch having a first edge and a second edge both of which defines the elongated hole, the first edge being at a side of the first position, the second edge being at a side of the second position;

wherein in a state where the transmission switch is at the first position, the first edge is positioned outside a revolving range of the pendulum gear, and the second edge is at the uncoupled position of the pendulum gear, and the shaft of the pendulum gear is held at the uncoupled position upon contact with the second edge; and wherein in a state where the transmission switch is at the second position, the first edge and the second edge are positioned outside the revolving range of the pendulum gear, and the shaft of the pendulum gear is held between the first edge and the second edge so that the pendulum gear is revolvable between the coupled position and the uncoupled position.

7. The image forming apparatus according to claim 1, wherein the sheet cassette further comprises a side wall; and wherein the pressing portion is a rib protruding from the side wall.

* * * * *